United States Patent [19]

Shiomi et al.

[11] 4,299,754

[45] Nov. 10, 1981

[54] SURFACE TREATING AGENT AND METHOD FOR ITS PRODUCTION

[75] Inventors: Teiichi Shiomi; Tadao Saito, both of Ohtake; Riichiro Nagano, Yamaguchi, all of Japan

[73] Assignee: Mitsui Petrochemical Industries Ltd., Tokyo, Japan

[21] Appl. No.: 81,200

[22] Filed: Oct. 2, 1979

[30] Foreign Application Priority Data

Oct. 4, 1978 [JP] Japan ............................... 53-121438

[51] Int. Cl.³ ............................................... C08K 5/01
[52] U.S. Cl. ........................................... 260/33.6 UA
[58] Field of Search ............... 260/33.6 UA; 525/285, 525/301

[56] References Cited

U.S. PATENT DOCUMENTS

| | | | |
|---|---|---|---|
| 3,125,462 | 3/1964 | Rachinsky | 525/285 |
| 3,579,486 | 5/1971 | McConnell et al. | 525/285 |
| 3,928,497 | 12/1975 | Ohmori et al. | 525/285 |

FOREIGN PATENT DOCUMENTS

| | | |
|---|---|---|
| 835910 | 3/1970 | Canada . |
| 47-10890 | 6/1972 | Japan . |
| 48-20824 | 3/1973 | Japan . |
| 48-20844 | 3/1973 | Japan . |

*Primary Examiner*—Lewis T. Jacobs
*Attorney, Agent, or Firm*—Sherman & Shalloway

[57] ABSTRACT

A surface treating agent for fabricated articles of polyolefins which is composed of an organic solvent solution of a modified polymer resulting from the graft copolymerization of a propylene-ethylene copolymer with maleic acid or maleic anhydride. The propylene-ethylene copolymer has a propylene content of 50 to 75 mole % and a crystallinity determined by an X-ray diffraction method of 2 to 20%. The amount of maleic acid or maleic anhydride grafted is 0.5 to 15% by weight. The modified polymer has an intrinsic viscosity of at least 0.3, and is dissolved in the organic solvent in a concentration of 10 to 100 kg/m³ of solvent. The treating agent is suitable as an undercoat of the polyolefin articles and permits coating of a paint with markedly improved adhesion.

7 Claims, No Drawings

SURFACE TREATING AGENT AND METHOD FOR ITS PRODUCTION

This invention relates to a surface treating agent which is suitable for application to the surface of a fabricated plastic article composed of a polyolefin such as polypropylene or such a fabricated article as an automobile bumper composed of polypropylene and a synthetic rubber to improve adhesion of a paint, etc. thereto. It also pertains to a process for producing the aforesaid surface treating agent.

Fabricated articles of polyolefins such as polypropylene are rendered suitable for end uses by applying a paint to their surfaces or bonding fabricated articles, etc. of other resins thereto. However, since polyolefin articles have low polarity and exhibit poor adhesion of general paints thereto, the paint adhesion of their surfaces is improved by treatment with chromic acid, flame, a solvent, etc. These methods require complicated treatments and are time-consuming. Or because of the use of corrosive chemicals, such a treatment involves danger. Moreover, a strict control of the process is necessary in order to impart stable adhesiveness. Accordingly, these techniques are substantially not in use now.

Japanese Laid-Open Patent Publication No. 20824/73 discloses a method which comprises chemically bonding an alicyclic carboxylic acid having a cis-type double bond in the ring or its anhydride to a propylene polymer in the presence of a radical generator to modify the polymer, and then fabricating the modified polymer; and a method which comprises fabricating a propylene polymer, and then chemically bonding the aforesaid alicyclic carboxylic acid or its anhydride to the surface of the fabricated article. The former method, however, is economically disadvantageous because the entire propylene polymer must be modified in order to improve only the surface of the fabricated article. The latter method includes a complex treating process, and is time-consuming.

On the other hand, methods involving treating the surface of a fabricated article with a surface treating agent or a primer, etc. have the advantage of being practicable on a continuous line including a coating step since they can impart adhesiveness by a simple operation and require only a short period of time for the treatment. Some treating agents, i.e. primers, for use in such an undercoating treatment have been suggested in the past.

For example, Canadian Pat. No. 835,910 discloses a treating agent solution prepared by dissolving in a solvent an amorphous propylene polymer modified with a specified proportion of maleic acid or its anhydride. The amorphous propylene polymer is defined in this Patent as an amorphous propylene homopolymer called atactic polypropylene and an amorphous copolymer of propylene and at least one comonomer containing about 20 mole% of a propylene unit. As a similar treating agent to that disclosed in the Canadian Patent, Japanese Laid-Open Patent Publication No. 10890/74 discloses a surface treating agent containing a modified polyolefin which is prepared by chemically bonding an alicyclic carboxylic acid having a cis-type nonconjugated double bond in the ring or its anhydride or an $\alpha,\beta$-unsaturated carboxylic acid or its anhydride to an amorphous polyolefin. This amorphous polyolefin is also a noncrystalline polymer.

Certainly, the use of these treating agents $\gamma$ results in an improvement in adhesion between a fabricated article and a paint. But with the passage of time, the adhesiveness decreases. Furthermore, the surface of the fabricated article which has been coated with such a treating agent is sticky, and tends to cause uneven thickness. Also, the smoothness of a paint film applied to it is unsatisfactory.

Japanese Laid-Open Patent Publication No. 20844/73 suggests a method which comprises dipping a fabricated article of a polyolefin in a surface treating agent composed of a solution of a rubber or an addition polymer resin having a polar group in a halogenated hydrocarbon solvent. This method is being applied to fabricated articles of polyethylene, polypropylene, etc. The treated articles have good adhesion to paints, and are used to produce sundries, receptacles, automobile parts, fibers, nonwoven fabrics, etc.

In recent years, a higher level of paint adhesion has been required in plastic articles for automotive applications, and the painted film is required not to peel easily on contact with gasolines, etc. (gasoline resistance), or upon exposure to extreme temperature variations (thermal shock resistance). The conventional treating agents do not entirely meet these requirements.

Surface treating solutions should desirably be coatable by a sprayer in order to simplify the process. However, with some conventional treating agents, the concentration of the modified polymer must be increased to obtain sufficient adhesion. This increases the viscosity of the treating agent and the treating agent is difficult to apply by a sprayer.

It is an object of this invention to remove the aforesaid defects of the prior art, and to provide a surface treating agent which is free from stickiness and uneven thickness after application and permits formation of a paint film having superior gasoline resistance and thermal shock resistance.

Another object of this invention is to provide a surface treating agent suitable for application by a sprayer.

The objects of this invention are achieved by a surface treating agent composed of an organic solvent solution of a modified polymer resulting from graft copolymerization of a propylene-ethylene copolymer with maleic acid or maleic anhydride, said propylene-ethylene copolymer having a propylene content of 50 to 75 mole% and a crystallinity, determined by an X-ray diffraction method, of 2 to 20%, the amount of said maleic acid or maleic anhydride grafted being 0.5 to 15% by weight, and said modified polymer having an intrinsic viscosity of at least 0.3 and being dissolved in an amount of 10 to 100 kg per cubic meter of the organic solvent.

The surface treating agent of this invention can be prepared by a method which comprises dissolving a propyleneethylene copolymer having a propylene content of 50 to 75 mole% and a crystallinity determined by an X-ray diffraction method of 2 to 20% in an organic solvent, graft-copolymerizing the propylene-ethylene copolymer with maleic acid or its anhydride in the presence of a radical generator (to be referred to as a solution method), and optionally diluting the product, to provide an organic solvent solution of the modified polymer in a concentration of 10 to 100 kg per cubic meter of the organic solvent. It can also be prepared by a method which comprises adding maleic acid or its anhydride and a radical generator to the aforesaid propylene-ethylene copolymer, performing graft copolymerization in the molten state (to be referred to as a melting method), and dissolving the resulting modified polymer in an organic solvent in a concentration of 10 to 100 kg per cubic meter of the organic solvent.

The propylene-ethylene copolymer as a material for the modified polymer is preferably a random copolymer of propylene and ethylene. It has a propylene content of 50 to 75 mole%, preferably 60 to 70 mole%, and an intrinsic viscosity $[\eta]$, as a measure for its molecular weight, of 0.3 to 20, preferably about 0.3 to 10, determined in decalin solution at 135° C. (unit dl/g).

The crystallinity of the copolymer varies depending upon the ratio between propylene units and ethylene units or the bonding mode of their units. A good surface treating solution can be obtained when ethylene-propylene copolymers having the propylene content and intrinsic viscosity within the above-specified ranges have a crystallinity, measured by an X-ray diffraction method, of about 2 to 20%, preferably 5 to 18%. If the crystallinity of the copolymer is less than 2%, a paint film formed after application of the resulting treating agent has poor gasoline resistance and thermal shock resistance (especially heat resistance). On the other hand, if the crystallinity is higher than 20%, the solubility of the modified copolymer decreases and the surface treating agent cannot be uniformly spray-coated.

If the propylene content of the copolymer is less than 50 mole%, a gel may form at the time of graft-copolymerization with maleic acid or maleic anhydride to decrease the solubility of the modified copolymer in an organic solvent, and a uniform solution is difficult to obtain. Furthermore, this leads to an increase in viscosity, and the resulting solution is difficult to spray-coat. Moreover, a paint film formed after application of the treating solution has poor gasoline resistance. If the propylene content exceeds 75 mole%, the crystallinity of the copolymer increases to cause a decrease in solubility in an organic solvent. Furthermore, when the copolymer having such a high propylene content is modified with maleic acid or maleic anhydride, the solubility of the modified polymer in an organic solvent decreases, and the molecular weight of the modified polymer also decreases. Consequently, after drying, the paint film has low mechanical strength, and low adhesion to a substrate article.

As stated hereinabove, the surface treating agent of this invention can be prepared by the solution method which comprises dissolving the ethylene-propylene copolymer in an organic solvent, adding maleic acid or maleic anhydride and a radical generator, and heating the mixture with stirring to obtain a solution of the modified ethylene-propylene copolymer in the organic solvent. The solution is used as the desired surface treating agent either as such or after diluting it with a solvent. Or the modified polymer is separated from the resulting solution and then dissolved in a solvent to obtain the surface treating agent. Or the surface treating agent may also be conveniently obtained by the melting method which comprises feeding the aforesaid materials into an extruder or the like, melting them and performing graft copolymerization. The resulting modified copolymer is dissolved in an organic solvent to form the desired surface treating agent.

According to the solution method followed by dilution of the reaction solution with an organic solvent, an especially homogeneous solution of the modified polymer can be obtained, and the desired surface treating agent can be prepared by a simple operation. In this method, maleic acid or its anhydride and the radical generator are preferably added portionwise to the solution of the unmodified ethylene-propylene copolymer, because this prevents precipitation or gellation of the copolymer and maleic acid or its anhydride can be graft-copolymerized uniformly with the copolymer of propylene and ethylene.

Preferred conditions for graft copolymerization are described below. Maleic acid or its anhydride in a proportion of 1 to 100 millimoles/min./kg of copolymer, especially 2 to 20 millimoles/min./kg of copolymer, is added portionwise to a solution of a propylene-ethylene copolymer in an organic solvent in a concentration of 10 to 500 kg, especially preferably 100 to 400 kg, per cubic meter of the organic solvent. The radical generator is also added portionwise at a rate of $5\times10^{-5}$ to 50 millimoles/min./kg of copolymer, especially preferably about $1\times10^{-2}$ to 5 millimoles/min./kg of copolymer. The mole ratio of the radical generator to maleic acid or maleic anhydride is from about 1/100 to about 3/5, especially from about 1/20 to about $\frac{1}{2}$.

Preferably, the grafting reaction is carried out by heating the copolymer solution with strong stirring. The suitable reaction temperature is a temperature above the melting point to 100° C., especially about 120° to about 160° C. The suitable reaction time is usually from 2 to 10 hours. The reaction operation may be performed either batchwise or continuously. But the batch operation is preferred in order to perform the grafting reaction uniformly.

According to the preferred embodiment illustrated above, the formation of a homopolymer of maleic acid is extremely inhibited, and the amounts of the unreacted monomer, radical generator and decomposition products thereof which remain at the end of the reaction can be minimized.

The proportion of the maleic acid or maleic anhydride in the resulting graft-modified copolymer is from 0.5 to 15% by weight, especially preferably 3 to 10% by weight. If the proportion is less than 0.5% by weight, the paint adhesion of the resulting treated surface is insufficient, and a paint film applied has poor gasoline resistance. If the proportion exceeds 15% by weight, the intrinsic viscosity $[\eta]$ of the grafted copolymer becomes low, and its cohesive force is reduced. The water resistance of a paint film is poor.

The crystallinity of the graft copolymer is slightly lower than that of the unmodified copolymer, and scarcely changes.

The resulting graft copolymer solution may be used directly as the surface treating agent of this invention. Or the graft copolymer solution is diluted with an organic solvent, or the grafted copolymer itself is dissolved in an organic solvent to form the surface treating agent of this invention. At this time, the concentration of the modified copolymer in the solution is adjusted to 10 to 100 kg/m³ of solvent, especially 20 to 60 kg/m³ of solvent. If the concentration is below 10 kg/m³ of solvent, coating unevenness occurs on the surface spray-coated with the solution, and paint adhesiveness of the surface varies widely. On the other hand, if the concentration exceeds 100 kg/m³ of solvent, the coated layer formed becomes thick and sticky, and thickness unevenness tends to occur. Furthermore, the coated surface has poor smoothness.

The radical generator used in the graft reaction may be any radical generator which promotes the reaction between the copolymer and maleic acid or maleic anhydride. Organic peroxides and organic peresters are preferred. Specific examples include benzoyl peroxide, dichlorobenzoyl peroxide, dicumyl peroxide, di-tert-butyl peroxide, 2,5-dimethyl-2,5-di(peroxybenzoate)-hexyne-3, 1,4-bis(tert.-butyl peroxyisopropyl)benzene, lauroyl peroxide, tert-butyl peracetate, 2,5-dimethyl-2,5-di(tert-butylperoxy)hexyne-3, 2,5-dimethyl-2,5-di(-tert-butylperoxy)hexane, tert-butyl perbenzoate, tert-butyl perphenylacetate, tert-butyl perisobutyrate, tert-butylper-sec-octoate, tert-butylperpivalate, and tert-butyl perdiethylacetate. Azo compounds such as azobisisobutyronitrile and dimethyl azoisobutyrate can also be used. Of these, dialkyl peroxides such as dicumyl peroxide, di-tert-butyl peroxide, 2,5-dimethyl-2,5-di(tert-butylperoxy)hexyne-3, 2,5-dimethyl-2,5-di(tert-butyl-peroxy)hexane and 1,4-bis(tert-butylperoxyisopropyl)-benzene are preferred.

When the modification of the copolymer is carried out in an organic solvent and the resulting reaction solution is used as a sprayable coating solution after adjusting the concentration of the modified polymer to 10 to 100 kg/m$^3$ of solvent with or without dilution with the same or other organic solvent, it is preferable to use those radical generators whose decomposition products have relatively low boiling points, such as di-tert-butyl peroxide, tert-butyl peroxyisobutyrate, tert-butyl peroxyocate, etc. If such a radical generator is used, its decomposition product can be easily volatilized and removed together with the organic solvent in the drying step of the surface treating solution. Thus, the resulting coated film has much better adhesion to a paint, and can be used as the primer layer of coating an agent for improving surface hardning or gloss, and of vacuum metallizing, etc.

Examples of the organic solvent are aromatic hydrocarbons such as benzene, toluene and xylene, aliphatic hydrocarbons such as hexane, heptane, octane and decane, and chlorinated hydrocarbons such as trichloroethylene, perchloroethylene, dichloroethylene, dichloroethane and chlorobenzene. Since the use of chlorinated hydrocarbons tends to form a gel and they are strongly toxic, the aromatic hydrocarbons are especially preferred. Alkyl-substituted aromatic hydrocarbons are especially preferred.

When modification of the propylene-ethylene copolymer with maleic acid or maleic anhydride is carried out in an organic solvent, the organic solvent may sometimes be modified with maleic acid or maleic anhydride. The alkyl-substituted aromatic hydrocarbons such as toluene are especially susceptible to this modification.

The surface treating agent of this invention may contain such additives as a heat or weather resistance stabilizer, a viscosity regulating agent like silica, a colorant, etc., and is applicable to fabricated articles of polyolefins which are produced by various melt-shaping methods. Specific examples of the polyolefins for producing these fabricated articles include high-pressure polyethylene, medium-pressure polyethylene, low-pressure polyethylene, polypropylene, poly-4-methyl-pentene-1, polybutene-1, polystyrene, and copolymers of olefins such as an ethylene-propylene copolymer, an ethylene-butene copolymer, and a propylene-butene copolymer. Mixtures of these polymers can also be used.

Paint adhesion is especially good when inorganic fillers and pigments such as talc, zinc oxide, glass fibers, titanium white and magnesium sulfate are incorporated in these polyolefins.

The polyolefins may also include other compounding agents such as stabilizers, ultraviolet absorbers and hydrogen chloride absorbers. Examples of preferred stabilizers include phenol-type stabilizers such as 2,6-ditert-butyl-4-methylphenol, tetrakis [methylene(3,5-ditert-butyl-4-hydroxyhydrocinnamate)]methane, meta-octadecyl-3-(4'-hydroxy-3,5'-ditert-butylphenyl)propionate, 2,2'-methylenebis(4-methyl-6-tert-butylphenyl), 4,4'-butylidenebis(3-methyl-6-tert-butylphenol), 4,4'-thiobis(3-methyl-6-tert-butylphenol), 2,3-thiobis(4-methyl-6-tert-butylphenol), 1,3,5-trimethyl-2,4,6-tris(3,5-ditert-butyl-4-hydroxybenzyl)benzene and 1,3,5-tris(2-methyl-4-hydroxy-5-tert-butylphenyl)butane; sulfur-type stabilizers such as dilauryl thiodipropionate and distearyl thiodipropionate; and phosphorus-type stabilizers such as tridecyl phosphite and trinonylphenyl phosphite. Examples of preferred ultraviolet absorbers are 2-hydroxy-4-octoxybenzophenone, 2-ethylhexyl-2-cyano-3,5-diphenyl acrylate and p-octyl-phenyl salicylate. A preferred hydrogen chloride absorber is calcium stearate.

The surface treating agent of this invention can be coated by spraying, dipping and brush coating. Spray coating is especially preferred. Thus, the treating solution can be sprayed onto the surface of a fabricated article by a spray gun. The surface treating solution held at room temperature can exhibit its performance sufficiently. After the treatment, the fabricated article is dried spontaneously or by positively heating it.

The polyolefin article surface-treated in accordance with this invention is then coated with a paint by electrostatic coating, spray coating, brush coating, etc. The paint may be applied two or three times on the treated surface. There is no particular limitation to the paint used. When a paint film having especially high adhesion is required, it is preferable to use solvent-base thermoplastic acrylic resin paints, solvent-base thermosetting acrylic resin paints, acrylic-modified alkyd resin paints, epoxy resin paints, and polyurethane paints.

The painted polyolefin article is heated by a customary method such as electrical heating, infrared ray heating, or high-frequency heating to cure the coated film. The curing condition are determined depending upon the material and shape of polyolefin articles, and the properties of the paint.

The paint film formed on the polyolefin article surface-treated in accordance with this invention has excellent smoothness, and especially improved durable adhesion.

While the conventional surface treating agent is difficult to spray-coat to give a good coated film, in the present invention, the aforesaid effect can be produced even when the surface treating agent is applied by spraying. The superiority of the performance of the treating agent of this invention will become apparent from the following Examples.

EXAMPLE 1

Three kilograms of a propylene-ethylene copolymer having a propylene content of 67 mole%, an intrinsic viscosity at 135° C. in decalin of 2.05 (dl/g), and a crystallinity by an X-ray diffraction method of 12% was added to 10 liters of toluene, and the reaction system was purged with nitrogen for 1 hour. The temperature of the reaction system was raised to 145° C. to dissolve the copolymer completely in toluene. With stirring, 382 g of maleic anhydride and 175 g of ditertbutyl peroxide were fed into the reaction system over the course of 4 hours from separate feed openings. The mixture was further stirred at 145° C. for 2 hours, and the reaction solution was cooled to room temperature.

After cooling, a part of the reaction solution was sampled, and poured into a large amount of acetone to precipitate a crumb-like modified copolymer. The precipitate was collected by filtration, washed repeatedly with acetone, and dried in vacuo room temperature for 2 days to form a purified propylene-ethylene copolymer modified with maleic anhydride.

The amount of the maleic anhydride unit in the resulting modified copolymer was 5.3% by weight. The modified copolymer had an intrinsic viscosity of 0.88 (dl/g) and a crystallinity of 6.5%.

EXAMPLE 2

Nine liters of toluene was added to 1 liter of the reaction solution obtained in Example 1, and the reaction system was purged with nitrogen. The mixture heated to 100° C., and stirred for 1 hour to form a surface treating solution suitable for spray coating.

EXAMPLE 3

Thirty grams of the purified modified copolymer obtained in Example 1 was added to 1 liter of toluene. The reaction system was purged with nitrogen, and heated to 100° C. to dissolve the modified copolymer uniformly. Thus, a surface treating agent suitable for spray coating was obtained.

EXAMPLE 4

One kilogram of pellets of a propylene-ethylene copolymer having a propylene content of 60 mole%, an intrinsic viscosity of 3.0 (dl/g) and a crystallinity of 8% were mixed with 400 g of maleic anhydride and 200 g of 2,5-dimethyl-2,5-di(tert-butylperoxy)hexyne-3 as a radical generator. The mixture was fed into a hopper of a extruder (25 mm $\phi$). The screw set in the extruder was of the dulmage type shape, and was operated at 60 rpm.

The strand extruded from the extruder die was cooled with ice water, and fed into a pelletizer to form pellets.

The crude pellets obtained were added to xylene, and the mixture was heated to dissolve the pellets. The solution was cooled again to room temperature, and a large amount of acetone was added to form a crumb-like polymer precipitate. The precipitate was repeatedly washed with a large amount of acetone, and dried in vacuo for 2 days. The resulting purified modified copolymer contained 3.5% by weight of a maleic anhydride unit, and had an intrinsic viscosity of 1.10 (dl/g).

EXAMPLE 5

The modified copolymer obtained in Example 4 was dissolved in toluene in the same way as in Example 3 to form a surface treating solution.

EXAMPLES 6 to 16 AND COMPARATIVE EXAMPLES 1 to 6

Polypropylene (a product of Mitsui Petrochemical Industries, Ltd. Grade No. SJ 310) was injection-molded into a sheet having a size of 50 mm × 50 mm × 1 mm.

The sheet was spray-coated with each of the surface treating agents to be described hereinbelow at room temperature by an air spraying method, and allowed to stand at room temperature for about 5 minutes to dry it.

A paint obtained by diluting an acrylic resin-type paint or urethane-type paint with a thinner to a ratio of about 1:1 was spray-coated on the treated sheet, and baked in an air oven at 80° C. for 30 minutes.

The sheet was allowed to stand at room temperature for 24 hours, and tested for the following properties. The peel test was performed by providing cuts on the coated surface of the sheet longitudinally and transversely at intervals of 1 mm by using a knife to form 100 squares, applying an adhesive type (Nichiban Cellotape) to the cut surface, peeling the adhesive tape, and evaluating the adhesion of the coating by the number of remaining squares. When the coating completely adhered to the substrate, the result was 100, and when all squares were peeled off, the result was 0.

INITIAL ADHESION

The sheet was subjected directly to the peel

WATER RESISTANCE

The sheet was dipped in warm water at 40° C. for 240 hours, and subjected to the peel test.

GASOLINE RESISTANCE

The sheet was dipped in pertoleum benzine at 25° C. for 24 hours, and subjected to the peel test.

THERMAL SHOCK RESISTANCE

The sheet was subjected continuously to three cycles of −30° C., 1 hour→room temperature, 3 minutes→boiling water, 1 hour→room temperature, 5 minute, and then subjected to the peel test.

The results are shown in Tables 1 to 3.

Table 1 shows the effect of the concentration of the modified copolymer of the surface treating agent. The surface treating agent was prepared in accordance with the method of Example 2 except that a propylene-ethylene copolymer having a propylene content of 70 mole% and a crystallinity of 15% was used, the maleic acid-modified copolymer had an intrinsic viscosity of 0.76 (dl/g), and the maleic anhydride content of the modified copolymer was 3.5% by weight. The organic solvent was toluene, and the paint used was an acrylic resin-type paint (RECRACK 55, a product of Fujikura Kasei Co., Ltd.).

TABLE 1

| Example | Concentration of the surface treating agent (kg/m³ of solvent) | Initial adhesion | Water resistance | Gasoline resistance | Thermal shock resistance |
|---|---|---|---|---|---|
| 6 | 100 | 100 | 100 | 100 | 100 |
| 7 | 50 | 100 | 100 | 100 | 100 |
| 8 | 20 | 100 | 100 | 100 | 100 |
| 9 | 10 | 100 | 100 | 95 | 100 |
| Comparative Example 1 | 5 | 100 | 95 | 30 | 90 |
| Comparative Example 2 | 1 | 50 | 30 | 20 | 20 |

When the concentration of the modified polymer is less than 10 kg/m³ of solvent, the adhesion of the coating is insufficient. When it exceeds 100 kg/m³, the solution has a high viscosity and poor storage stability. Moreover, the solution is difficult to coat by spraying.

Table 2 shows the effect of the propylene content of the propylene-ethylene copolymer used in the surface treating agent of this invention. Specifically, the same tests as in Table 1 were performed using a surface treating agent which was prepared in the same way as in Example 2 except that a propylene-ethylene copolymer having each of the propylene contents shown in Table 2 was used, the concentration of the modified copolymer was adjusted to 30 kg/m³ of solvent, and the content of maleic anhydride in the modified copolymer was changed to about 6% by weight. The organic solvent was toluene, and the paint used was a urethane-type paint (UTHANALOL, a product of Ohashi Chemical Industries, Ltd.).

The results are shown in Table 2.

TABLE 2

| Example (Ex.) or Comparative Example (CEx.) | Propylene-ethylene copolymer | | $[\eta]$ of the modified copolymer (*) | Evaluation of the results of the peel tests | | | |
|---|---|---|---|---|---|---|---|
| | Propylene content (mole %) | Crystallinity (%) | | Initial adhesion | Water resistance | Gasoline resistance | Thermal shock resistance |
| CEx. 3 | 20 | 0 | 1.03 | 0 | — | — | — |
| Ex. 10 | 55 | 6 | 0.85 | 95 | 90 | 80 | 90 |
| Ex. 11 | 60 | 8 | 0.80 | 100 | 100 | 100 | 100 |
| Ex. 12 | 70 | 15 | 0.71 | 100 | 100 | 100 | 100 |
| CEx. 4 | 80 | 25 | 0.56 | 70 | 50 | 60 | 40 |

(*)The starting propylene-ethylene copolymer had an intrinsic viscosity $[\eta]$ of 2.1.

Table 3 shows the effect of the content of maleic anhydride in the modified polymer. The propylene-ethylene polymer used had a propylene content of 60 mole%, and the concentration of the modified copolymer in the surface treating agent was about 30 kg/m³ of solvent. The organic solvent was toluene, and the paint used was an acrylic resin-type paint (RECRACK 55, a product of Fujikura Kasei Co., Ltd.).

EXAMPLE 18

A surface treating solution was prepared in the same way as in Examples 4 and 5 except that the content of maleic anhydride in the modified polymer and the intrinsic viscosity of the modified polymer were changed as shown in Table 3. Using the resulting treating solution, coating was performed in the same way as in Example 6, and the coated article was subjected to the various tests. The results are also shown in Table 3.

TABLE 3

| Example (Ex.) or Comparative Example (CEx.) | Modified copolymer | | Evaluation of the results of the peel tests | | | |
|---|---|---|---|---|---|---|
| | Maleic anhydride content (wt. %) | $[\eta]$ (dl/g) | Initial adhesion | Water resistance | Gasoline resistance | Thermal shock resistance |
| CEx. 5 | 0 | 2.13 | 0 | — | — | — |
| Ex. 13 | 2.0 | 1.78 | 100 | 100 | 90 | 100 |
| Ex. 14 | 3.8 | 1.22 | 100 | 100 | 100 | 100 |
| Ex. 15 | 7.1 | 0.51 | 100 | 100 | 100 | 100 |
| Ex. 16 | 9.8 | 0.44 | 100 | 98 | 95 | 100 |
| Ex. 17 | 14.0 | 0.33 | 98 | 90 | 80 | 90 |
| Ex. 18 | 3.5 | 1.10 | 100 | 100 | 100 | 100 |
| CEx. 6 | 15.7 | 0.27 | 50 | 30 | 0 | 30 |

What we claim is:

1. A process for preparing a surface treating agent, which comprises dissolving a proplyene-ethylene copolymer having a propylene content of 50 to 75 mole% and a crystallinity determined by an X-ray diffraction method of 2 to 20% in an organic solvent and graft copolymerizing it with maleic acid or maleic anhydride in the presence of a radical generator to provide an organic solvent solution of the modified copolymer having a concentration of 10 to 100 kg per cubic meter of the solvent.

2. The process of claim 1 wherein said organic solvent is an aromatic hydrocarbon.

3. The process of claim 1 wherein said organic solvent is toluene.

4. The process of claim 1 wherein said propylene-ethylene copolymer has an intrinsic viscosity of from 0.3 to 20.

5. The process of claim 1 wherein the amount of maleic acid or maleic anhydride in the modified polymer is from 0.5 to 15% by weight.

6. The process of claim 1 which comprises graft copolymerizing the propylene-ethylene copolymer with maleic acid or maleic anhydride in the molten state, and dissolving the resulting modified polymer in an organic solvent so that the concentration of the modified polymer is 10 to 100 kg per cubic meter of the organic solvent.

7. The process of claim 1 comprising the additional step of diluting the graft copolymerization product with an organic solvent to provide an organic solvent solution of the modified copolymer having a concentration of 10 to 100 kg per cubic meter of the solvent.

* * * * *